(12) United States Patent
Kaufman et al.

(10) Patent No.: US 6,774,811 B2
(45) Date of Patent: Aug. 10, 2004

(54) DESIGNATION AND OPPORTUNISTIC TRACKING OF VALUABLES

(75) Inventors: James Harvey Kaufman, San Jose, CA (US); Cameron Shea Miner, San Jose, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 09/773,597

(22) Filed: Feb. 2, 2001

(65) Prior Publication Data

US 2002/0147650 A1 Oct. 10, 2002

(51) Int. Cl.[7] .............................. G08B 5/22; G06F 17/60
(52) U.S. Cl. .............................. 340/825.49; 340/10.41; 340/572.1; 705/22
(58) Field of Search ................................ 340/572, 540, 340/825.49, 573, 825.36, 10.34, 10.41, 10.1, 572.1; 705/22; 235/380, 379

(56) References Cited

U.S. PATENT DOCUMENTS

| 5,166,499 A | * | 11/1992 | Holland et al. ............. 235/376 |
| 5,319,364 A | | 6/1994 | Waraksa et al. ......... 340/825.72 |
| 5,485,520 A | * | 1/1996 | Chaum et al. ................ 705/74 |
| 5,708,423 A | | 1/1998 | Ghaffari et al. ......... 340/825.35 |
| 5,726,984 A | * | 3/1998 | Kubler et al. ............... 370/349 |
| 5,844,482 A | | 12/1998 | Guthrie et al. .............. 340/574 |
| 5,910,776 A | | 6/1999 | Black ..................... 340/825.35 |
| 5,949,335 A | | 9/1999 | Maynard .................. 340/572.1 |
| 5,977,913 A | * | 11/1999 | Christ .................... 340/825.36 |
| 6,002,427 A | | 12/1999 | Kipust ......................... 348/156 |
| 6,097,301 A | | 8/2000 | Tuttle ....................... 340/693.9 |
| 6,195,006 B1 | * | 2/2001 | Bowers et al. ........... 340/572.1 |
| 6,232,870 B1 | * | 5/2001 | Garber et al. ................ 235/380 |
| 6,424,264 B1 | * | 7/2002 | Giraldin et al. ........... 340/573.1 |
| 6,571,279 B1 | * | 5/2003 | Herz et al. ................... 709/217 |
| 6,573,833 B1 | * | 6/2003 | Rosenthal .................... 340/539 |
| 2001/0024174 A1 | * | 9/2001 | Turner ......................... 342/465 |
| 2002/0014955 A1 | * | 2/2002 | Klitsgaard ................ 340/10.42 |
| 2002/0036617 A1 | * | 3/2002 | Pryor ........................... 345/156 |
| 2002/0145043 A1 | * | 10/2002 | Challa et al. ............. 235/462.01 |
| 2003/0065805 A1 | * | 4/2003 | Barnes, Jr. ................... 709/231 |
| 2003/0067397 A1 | * | 4/2003 | Trimble ................. 340/825.49 |

* cited by examiner

*Primary Examiner*—Lynda Jasmin
(74) *Attorney, Agent, or Firm*—Lacasse & Associates, LLC; Randy W. Lacasse; Leonard Guzman (57) ABSTRACT

An item of value to one or more individuals in a group is tracked wherein each valuable object is tagged, and one or more members of the group carry a personal information management (PIM) device equipped with a sensor which constantly scans for the presence of a known valuable. The sensor is able to detect the type of tag(s) used by the group of individuals. Whenever a member of the group carrying a PIM device comes across a known tagged valuable, the system detects it and logs the location, valuable ID, and user ID in a database. Optionally, visual data is captured from the valuable and compared against a standard located in a database in order to locate the valuable.

26 Claims, 8 Drawing Sheets

DESIGNATION AND OPPORTUNISTIC TRACKING OF VALUABLES

BACKGROUND OF THE INVENTION

1. Field of Invention

The present invention relates generally to the field of object tracking. More specifically, the present invention is related to designating objects of value and the opportunistic tracking of these objects of value.

2. Discussion of Prior Art

A valuable, in the context of this application, is any object that is deemed of value by a client. The value placed on an object is not just limited to monetary value, as the object may also have intrinsic worth. For example, the object in question could be a timepiece of sentimental importance. Furthermore, some of these objects have a value associated with only one client, whereas some of them are recognized by a plurality of clients as being valuable. The object of value can be any of, but not limited to, the following resources—a person, a location, a book, jewelry, clothing, electronic devices, automobiles, etc.

A simple tracking procedure utilized in organizations such as FedEx® or UPS® involves scannable barcodes that are attached to packages containing valuables. Procedurally, the barcode on the package is first scanned before it leaves the premises of these organizations, and thereafter its location is recorded at various predetermined locations during its course of travel. Thus, the package is scanned only at pre-defined locations, based on a previously determined schedule. None of these prior art systems scan for the presence of the valuable in an opportunistic or unscheduled way.

Furthermore, prior art scenarios describe a group of several individuals sharing valuables or resources that are of high value, but not so valuable that they must be constantly tracked or stored in a locked location. But, none of the prior art systems allow clients in a group to label (designate) valuable resources as being of high value and to track them in an opportunistic way such that the system will store that last known location of a valuable and the last group member to have been in contact with it.

The following references describe prior art in the field of object tracking, but none of them detail the present invention's method and system of designating and tracking valuables in an opportunistic fashion.

U.S. Pat. No. 5,708,423 discloses a data processing system that automatically maintains records of respective locations of a plurality of objects in real-time. Each of the objects has secured thereto a respective object marker which transmits an identification signal that is unique to the respective object. Each sensor device, installed at doorways of a building, receives the identification signal transmitted from the object marker as the respective object is moved through the doorway.

U.S. Pat. No. 6,097,301 discloses an RF identification system for identifying objects by communication between a RF transceiver, mounted on each object, and a RF receiver. An interrogating receiver is mounted on the human operator.

U.S. Pat. No. 5,910,776 discloses a method and apparatus for identifying, locating, and monitoring equipment using a radio frequency identification transponder.

U.S. Pat. No. 5,319,364 discloses a passive keyless entry system which includes a portable beacon that is carried by an operator, and a receiver/controller located in the vehicle. The system is designed to lock the vehicle as the operator, carrying the beacon, moves away from the vehicle.

U.S. Pat. No. 6,002,427 discloses a security system with proximity sensor to protect against unauthorized access to an electronic device. The security system is armed upon an input from the proximity sensor indicating departure of an authorized user from the vicinity of the electronic device.

U.S. Pat. No. 5,844,482 discloses a tag monitoring system used for object movement. The tags used in this system incorporate a motion sensor which detects object movement and transmits this information to a central controller.

U.S. Pat. No. 5,949,335 discloses a radio frequency identification (RFID) tagging system for network assets wherein a transponder tag attached to an asset in a computer network stores inventory data describing the asset.

Whatever the precise merits, features and advantages of the above cited references, none of them achieves or fulfills the purposes of the present invention.

SUMMARY OF THE INVENTION

The present invention provides for a system and method for tracking of an item with a group of individuals. In the preferred embodiment of the invention, each valuable object is tagged and each member of a group carries a personal information manager (PIM) device equipped with a sensor which constantly scans for the presence of a known valuable—the sensor being able to detect the type of tag(s) used by the group of individuals. Whenever a member of the group carrying a PIM device comes across a known tagged valuable, the system detects it and logs the location, valuable ID, and user ID in a database. Tags that are used in conjunction with this invention include, but are not limited to, RF ID tags or bar code tags.

In a further embodiment, an image of the valuable is captured and compared against a standard image, wherein the valuable is detected (and hence location, valuable ID, and user ID are recorded) if there is a match between the captured image and the standard image.

DESCRIPTION OF THE PREFERRED EMBODIMENTS

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Items get lost or misplaced. This is especially true when items are shared by a group of people, and are therefore moved often from place to place. This is true of books, jewelry, clothing, electronic devices, automobiles, etc. It is expensive to constantly track all items and often not worth the cost to do so. To impose complete control on these valuable items limits their accessibility and usefulness. The system of the present invention creates a collective memory of the location(s) where the valuable item was detected, and the identity of group members that have been in close physical proximity to the valuable items.

Whenever a client or group member decides that an item is valuable and should be so labeled, the client "tags" the valuable. The tag is passive and depending on the embodiment of the present invention, the client either labels it with an RF ID tag, a bar code, or captures a digital image of the valuable. After tagging, the tag ID and a description of the valuable are entered into the database along with its position and a reference to the client who tagged it.

Each client in a workgroup carries a PIM device equipped with a sensor which constantly scans for the presence of a known valuable. This sensor is designed to detect the type of tag(s) used by the group. An RF ID tag is detected with an RF tag reader; an image or bar code is detected using a digital optical device such as a digital camera working in the visible or near infrared.

Whenever a client carrying a PIM device comes across a known valuable, the system detects it opportunistically and logs the location, valuable ID, and client ID in a database. If for example, Joann Ruvolo is looking for her copy of a reference book Gradshteyn and Ryzhik, "Table of Integrals, Series, and Products", the system might record that Cameron Miner last detected this valuable in James Kaufman's office. In this way shared or community valuables that become misplaced are more easily found.

Figure 1A:
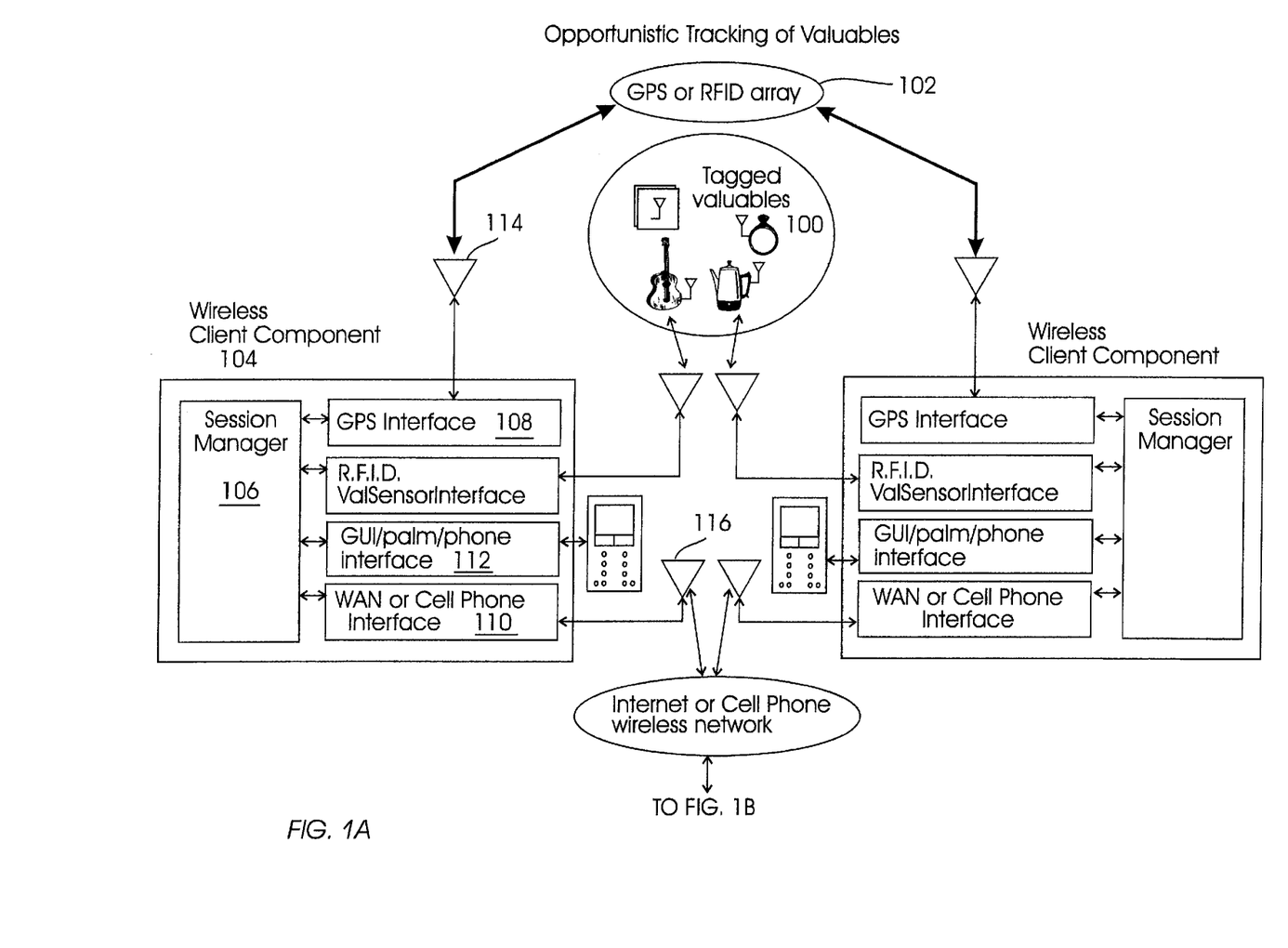
FIG. 1 illustrates the preferred embodiment of the present invention's system for opportunistic tracking of valuables.
Figure 1B:
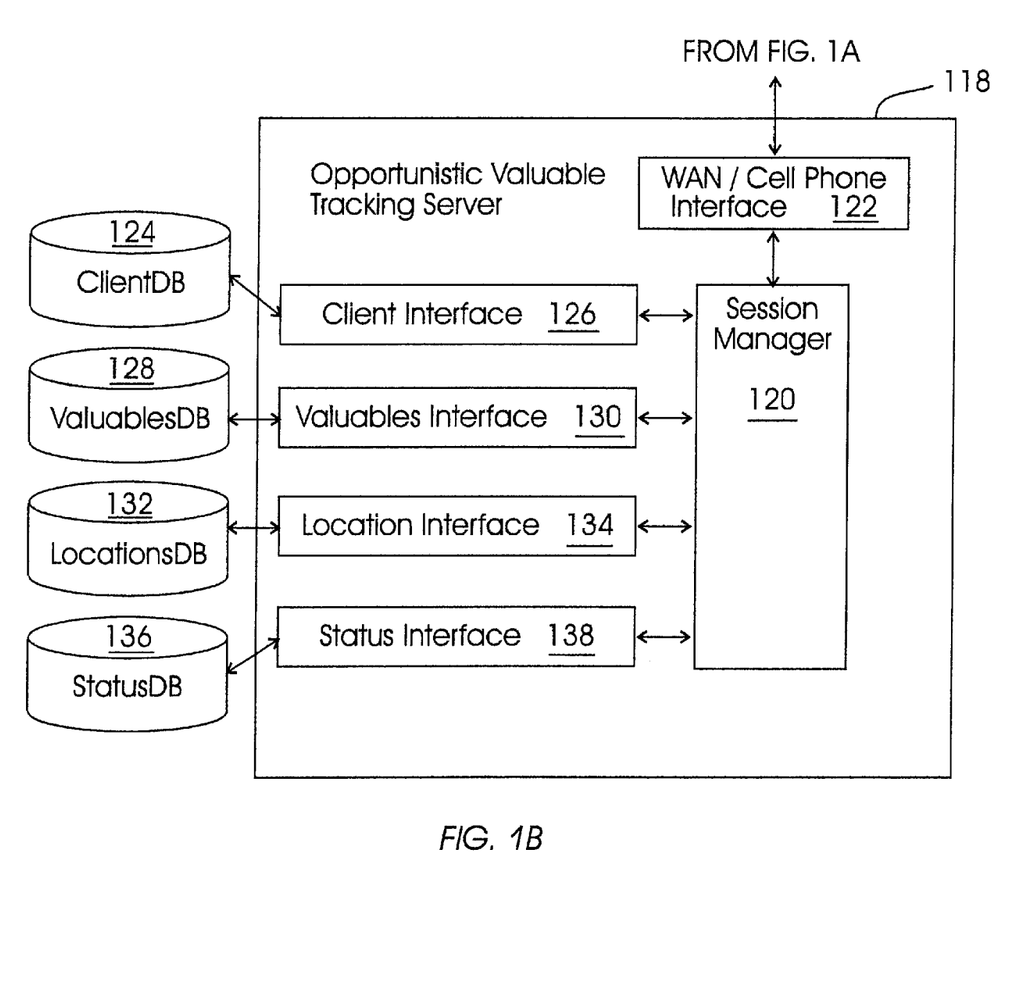

FIG. 1 illustrates a preferred embodiment of the present invention's system for opportunistic tracking of valuables. System components representative of the present invention's system for tagging and tracking a valuable object are discussed below:

Valuables: Valuables 100 are any objects that are of value to a client that need to be tagged and tracked.

GPS: GPS 102 is the existing satellite-based global positioning system (GPS). In the present invention, GPS technology is used for location tracking. Tracking inside a building is accomplished by various methods, such as, RFID tag sensors distributed throughout the site (each client wears a RFID tag), triangulation, or an aironet interface.

A wireless client component is connected to a wireless network via aironet. The aironet network has multiple hubs or ports located throughout the site to detect signals from the wireless PIM devices. In general, a PIM device is detected by more than one such hub and communicates with the port or hub which delivers and detects the largest signal. Since the system can detect an aironet client through several hubs, the system can triangulate to locate the client provided at least three hubs register a signal. In the absence of walls or barriers, the coordinates of client (x,y,z) relative to three hubs at $(x_1, y_1, z_1)$, $(x_2, y_2, z_2)$, $(x_3, y_3, z_3)$ is given by:

$$x=(S_1 x_1+S_2 x_2+S_3 x_3)/(S_1+S_2+S_3)$$
$$y=(S_1 y_1+S_2 y_2+S_3 y_3)/(S_1+S_2+S_3)$$
$$z=(S_1 z_1+S_2 z_2+S_3 z_3)/(S_1+S_2+S_3)$$

where $S_1$, $S_2$, and $S_2$ are the signal strengths at hubs 1, 2, 3 respectively. In general the location can be made more precise by taking a weighted average over more than three active hubs.

If the signal is known to be attenuated by walls (eg. because a hub is located in a closet or other structure), the expression above may be made more precise. The first order correction to the triangulation by three hubs is, $$x=(S_1 w_1 x_1+S_2 w_2 x_2+S_3 w_3 x_3)/(S_1 w_1+S_2 w_2+S_3 w_3)$$
$$y=(S_1 w_1 y_1+S_2 w_2 y_2+S_3 w_3 y_3)/(S_1 w_1+S_2 w_2+S_3 w_3)$$
$$z=(S_1 w_1 z_1+S_2 w_2 z_2+S_3 w_3 z_3)/(S_1 w_1+S_2 w_2+S_3 w_3)$$

where $w_1$, $w_2$, and $w_3$ are constant predefined calibration factors that correct for differences in gain, attenuation (shielding), and relative sensitivity of each of the hubs.

Wireless Client Component: Wireless client component 104 is a PIM device equipped with a user interface, a GPS interface, a sensor to detect "valuable" tags, and an Internet, Cell phone, or other wireless WAN interface. The GPS aspect of the wireless client component is implemented on a portable device, such as, laptop computer, cell phone, personal digital assistant (PDA) or integrated in a car system having a wireless wide area network (WAN) connection for communicating with active calendar service. Wireless client component 104 includes a GPS interface for receiving location information. The responsibility of the wireless client component is to determine the location of the current user and to transmit the location information to the opportunistic valuable tracking server (OVTS)118. In addition, wireless client component 104 will receive data from the OVTS 118 and display it for the user on a display device. The GPS wireless client interface operates under the control of the respective client session manager. Session manager 106 is responsible for the interaction between the sub-components of the wireless client component 104. It prepares the incoming data, such as location, time, valuable ID (detected via the valuable sensor interface), and wireless client component ID, and relays this data to the WAN or cell phone interface for transmission to the OVTS system. The session manager also prepares the data for display on the GUI or a screen on the portable device.

GPS Interface: GPS Interface 108 is implemented as a miniaturized GPS receiver that measures the time a radio signal needs from a GPS satellite in the GPS system until it arrives at the GPS antenna. By knowing the speed of the radio signal (the speed of light), and when each signal is transmitted, the distance to each satellite can be determined. The final solution of the equations produces an exact position of the antenna (latitude, longitude, altitude). GPS interface 108 determines a current location of GPS wireless client component 104 and supplies the current location to session manager 106.

WAN or Cell Phone Interface: WAN or cell phone interface 110 supports a wireless connection to the Internet or Intranet. With this interface, GPS wireless client component 104 is connected to the opportunistic valuable tracking server (OVTS) and the Internet or the phone system network.

Input/Output Device: The output device is implemented as a display of a wireless device and the input device as a touch screen or phone keyboard. The touch screen is used for manual user inputs and configuration. The display provides for output messages.

Opportunistic Valuable Tracking Server: OVTS component 118 is a web-based electronic active calendaring and profile system. One of the features of the system is that it automatically executes tasks. In this case, OVTS 118 automatically identifies valuables by their tags and maintains (e.g., in a database) a history of their locations, the clients PIM device which detects them, the time, and the location.

Session Manager: Session manager 120 is responsible for the communication and interaction between the internal components of OVTS 118. Furthermore, it measures periodically the position of users relative to specific locations, which are defined and stored in the locations database, and the specific location of valuables detected by the wireless client component (PIM) device.

Session manager 120 of the OVTS has accessor (getter and setter) methods which communicate with the Client Interface, the Valuables Interface, the Location Interface and the Status Interface. Session manager 120 also contains all of the logic to perform actions defined in the flowcharts (FIGS. 2–7). Session manager 120 is responsible for validating that a detected object is a valuable. It sets the appropriate databases to record history information about opportunistically detected valuables. It is also responsible for creating new database entries when new valuables are defined (created) in the system, and for removing entries if a valuable is removed from the system (and no longer being tracked). Session manager 120 also handles all queries or requests for information about the histories or last known locations of existing valuables.

Client Database: Client database 124 contains information about the clients in the system. Examples of client database 124 field definitions include (but are not limited to): primary key, client name, client ID number, other client data fields (address, email, phone number, etc.).

Client Interface: Client interface 126 contains the methods used by session manager 120 to access and modify the client description, tag ID, owner, value, history, etc.

Valuable Interface: Valuables interface 130 contains the methods used by the session manager to access and modify valuables database 128. Examples of valuables database 128 field definitions include (but are not limited to): primarykey, valuable name, valuable ID, valuable value, valuable owner (ref. to client primary key), (other information about a particular valuable such as date acquired, link to photograph, etc).

Location(s) Database: Locations database 132 contains information about the current location of important clients, valuables, and other system resources. Session manager 120 will access this database, for example, to determine the location of a valuable. Examples of location database 132 field definitions include (but are not limited to): primary key, foreign key to valuable, foreign key to client (last to see valuable), coordinates X,Y,Z of last known location, time location data acquired, etc.

Location Interface: Location interface 134 contains the methods used by the session manager to access and modify locations database 132.

Status Database: Status database 136 contains information about the status of the system. Status database 136 comprises 4 or more tables associated with field definitions.

TABLE 1

Valuables Status

Field definitions include (but are not limited to): primary key, foreign key to valuable, foreign key to last known location, foreign key to last client to see valuable, valuable status (tracked, found/missing).

TABLE 2

PIM Status

Field definitions include (but are not limited to): primary key, PIM ID, status of PIM (online/offline), timestamp.

TABLE 3

OVTS Status

Field definitions include (but are not limited to): primary key, system status, timestamp.

TABLE 4

Network Status

Field definitions include (but are not limited to): primary key, network status, timestamp, GPS status, etc.

Status Interface: Status interface 138 contains the methods used by session manager 120 to access and modify status database 136.

Figure 2:
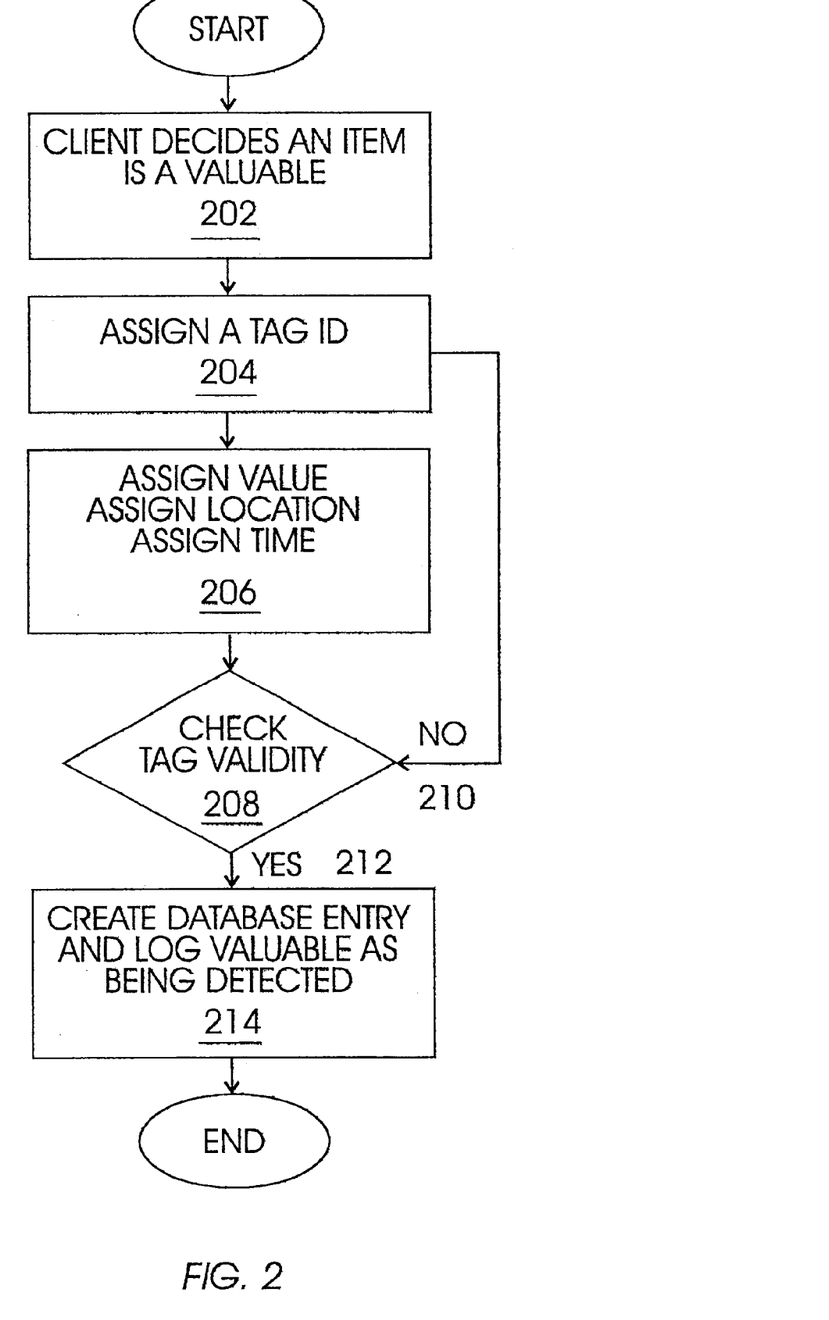
FIG. 2 illustrates the present invention's method for identifying and logging valuables.
Figure 3:
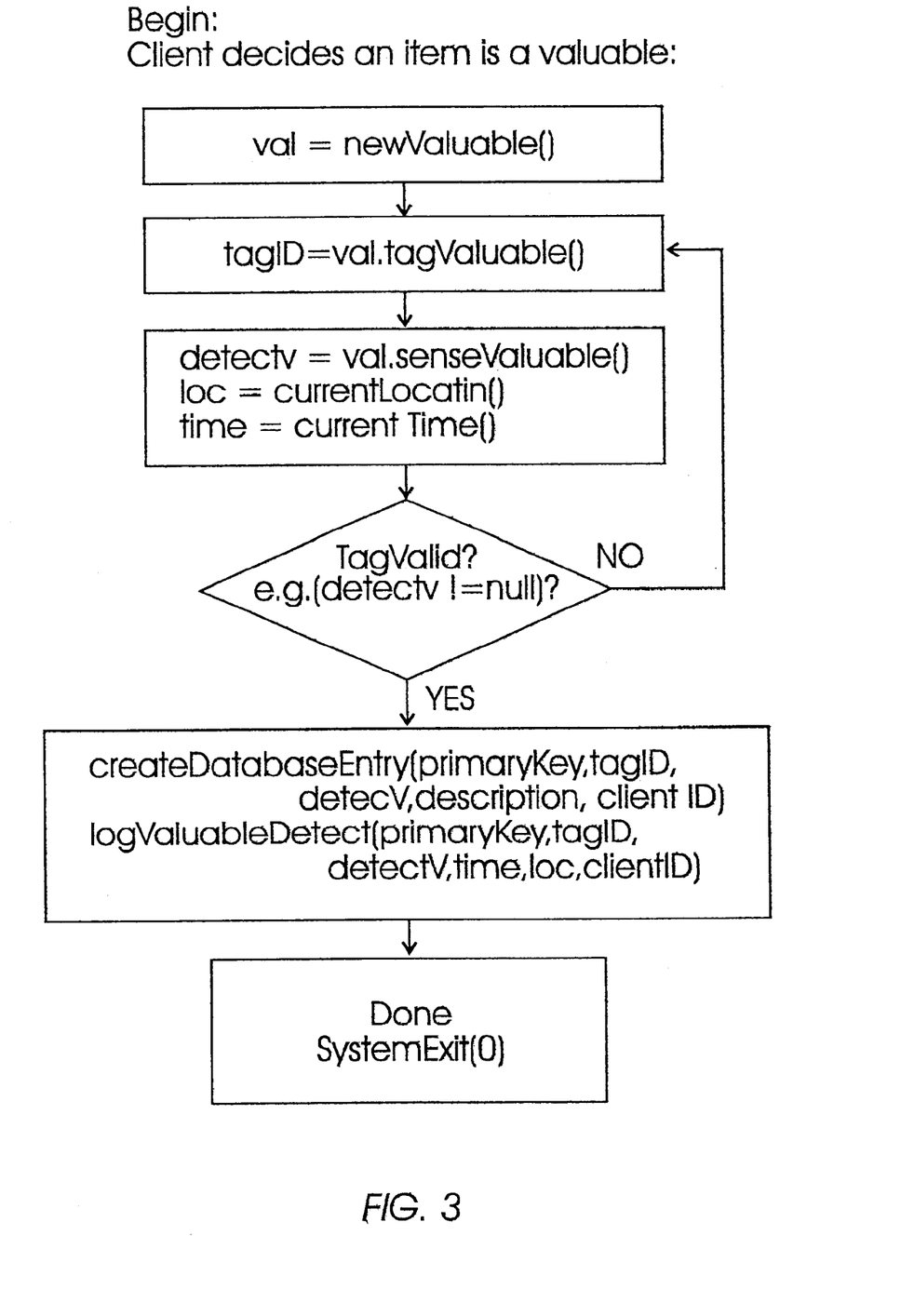
FIG. 3 illustrates the implemented algorithm for identifying and logging valuables.

FIG. 2 illustrates the present invention's method for identifying and logging valuables. First, a client decides an item is a "valuable" 202. Then, the valuable is assigned an identification in the form of a tag ID 204. Next, the valuable is detected, and its location and time of detection are recorded 206. Furthermore, check 208 is performed to see if the existing tag is valid, and if valid 212, a database entry is created (with information regarding the detected valuable, the person who helped detect the valuable, and the time of detection) and the valuable is logged as being detected 214. In the instance of an invalid tag 210, the steps starting with assigning a tag ID are repeated. FIG. 3 illustrates the algorithm associated with the method (as shown in FIG. 2) of identifying valuables and logging them in a database.

Figure 4:
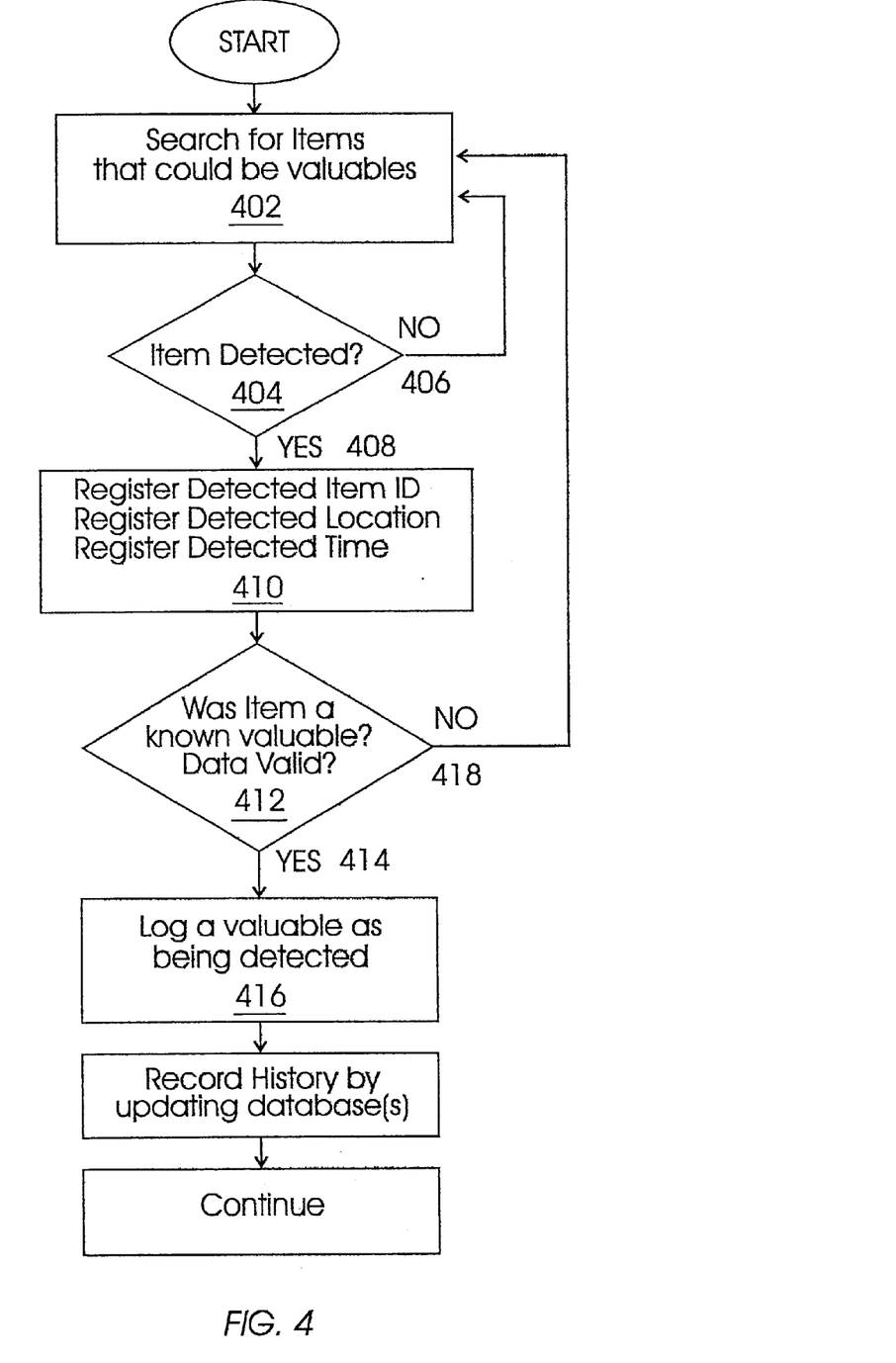
FIG. 4 illustrates the present invention's method for opportunistic tracking.
Figure 5:
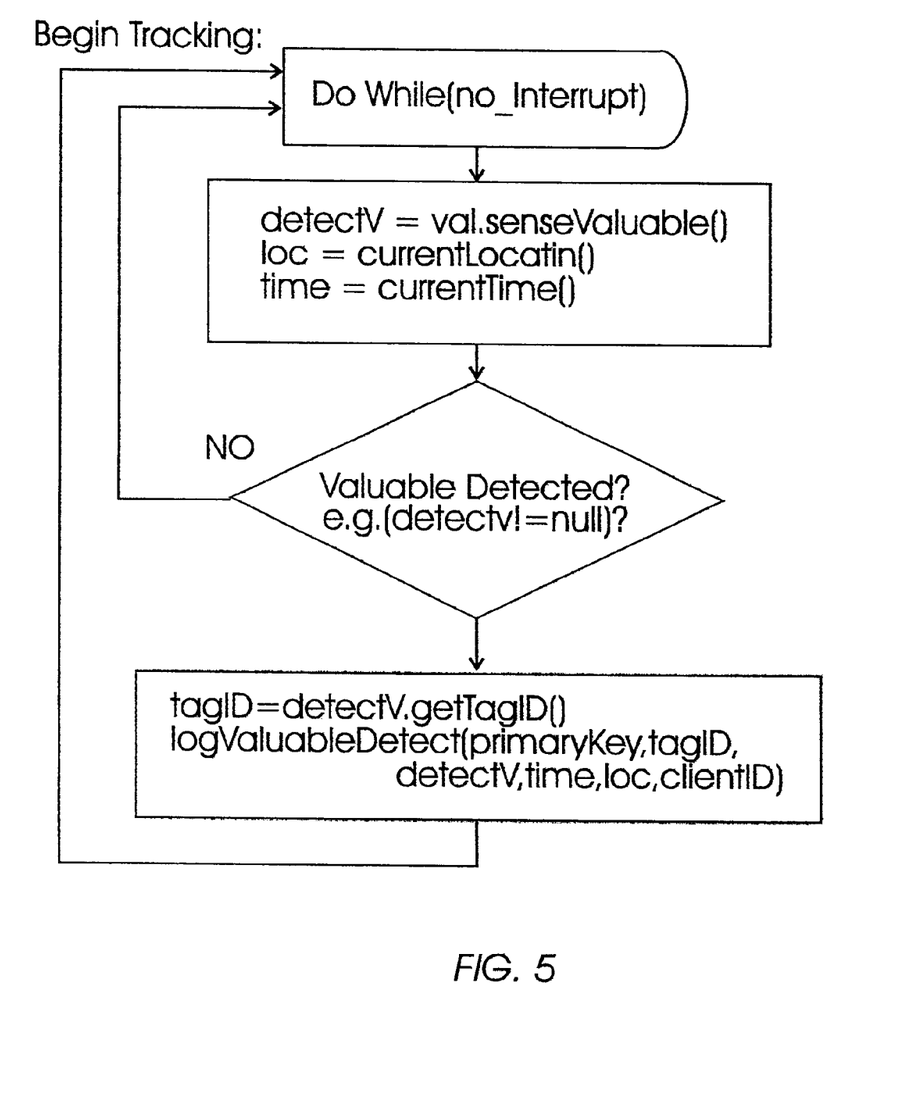
FIG. 5 illustrates the implemented algorithm for opportunistic tracking.

FIG. 4 illustrates the method of the present invention for opportunistic tracking of valuables. First, a search is performed 402 to identify items of value. Next, check 404 is performed to see if a detected item is a valuable. In the instance a valuable is not detected 406, step 402 is repeated again. On the other hand, as soon as a valuable is detected 408 by the tag (that is carried by users), the identification of valuable, the location of the valuable, and time of detection are recorded or registered 410. Next, a check is performed to see if the detected valuable is a valid one 412, and if so 414, the tag ID is extracted from the valuable and the valuable is logged in the database as being detected 416. Upon detection, information regarding the tag ID, the valuable detected, the time of detection, the location of detection, and the user who helped detect the valuable are logged into a database. In the instance that a valuable is not valid 418 during the checking 412, the step of searching for a valuable 402 is repeated. This process is repeated as the valuables are dynamically monitored by the tags on different users. FIG. 5 further illustrates the algorithm associated with the method for tracking valuables in an opportunistic fashion.

Figure 6:
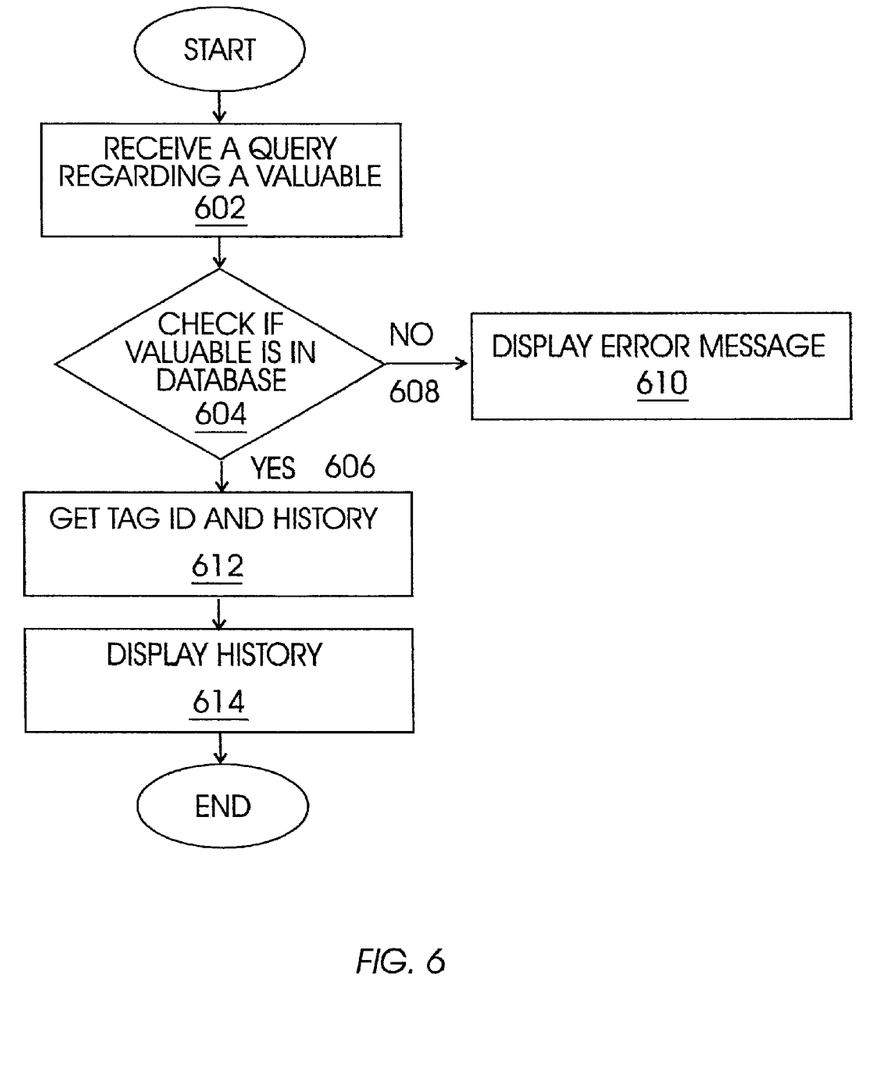
FIG. 6 illustrates the present invention's method of finding a lost valuable.
Figure 7:
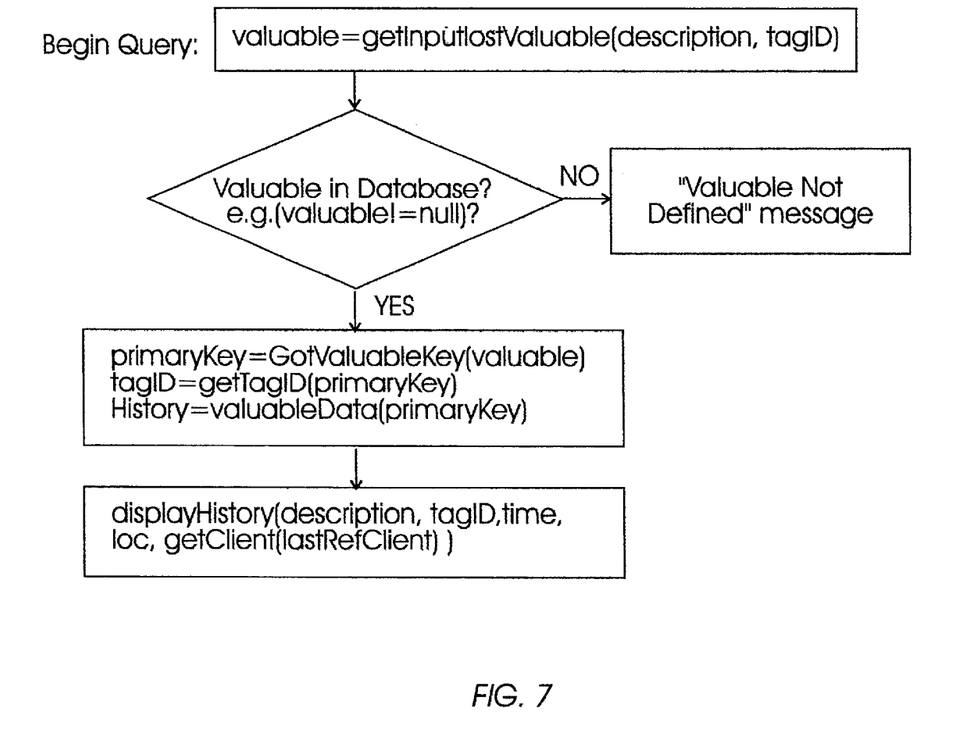
FIG. 7 illustrates the implemented algorithm for finding a lost valuable.

FIG. 6 illustrates the present invention's method for finding a lost valuable. First a user queries, via an interface, regarding a specific valuable 602. Next, a check 604 is performed to see if the queried valuable exists in the database, and if so 606, the present invention's system extracts the tag ID and history 612 corresponding to the queried valuable. The history comprises information which includes, but is not limited to valuable description, valuable tag ID, previous times of detection, previous locations, and a list of users who have been close enough to detect the valuable. Lastly, the extracted history is displayed along with the last user who helped detect the valuable 614. In the event that the valuable is not registered in the database and is not located 608, an error message is displayed to the user 610. FIG. 7 illustrates the algorithm associated with finding a lost valuable.

A few examples of opportunistic tracking of valuables are given below:

Patrol Car:

A police car (or other security car) with a video camera mounted on it patrols through a freight yard or dockyard and the video camera, which is connected by LAN or WAN to a server, captures and records the video feed. The video data is analyzed to detect barcodes painted or printed on freight containers and other valuable equipment in the yard. The system uses standard image analysis techniques and algorithms to detect any high contrast pattern of stripes. It reduces the dataset (narrowing in on the stripes) and rotates the image until any stripes detected are vertical. The image is rescaled to a fixed predefined size and the stripes are analyzed based on the assumption they represent a barcode. False images (not barcodes) will simply not be recognized, and are, therefore, ignored. Whenever a valid barcode is detected (with a serial number of a valuable known to the system), the system logs the presence of the valuable along with the known position of the patrol car (based on GPS or some other location based measurement).

Guard Dog:

This example is similar to the patrol car example described above except instead of a patrol car, a guard dog carries a video camera or laser scanning device. The dog is trained to recognize bar codes and run up to them so the system can scan more efficiently.

Museum:

A person wearing a miniaturized camera (which might be shaped as jewelry) walks through a museum, showroom, or location with expensive photographs or paintings mounted on the wall. The camera captures real-time video as described above. The image recognition system is used to detect (first) rectangles (picture frames) and then analyzes the region in the rectangles to match against already captured images of the valuable paintings or photographs. When a match is found, the presence of the valuable along with the known position of the person (based on RF or GPS tracking) is logged.

Thus, the present invention provides for a system and a method for designating and tracking valuables in an opportunistic way. Furthermore, the present invention is superior to any of the prior art systems described, because the valuable to be tracked is detected in an unscheduled way. Also, the present invention allows for an object of value to be mobile and not be confined to a particular space.

The above enhancements for a system for opportunistic tracking of valuables and its described functional elements are implemented in various computing environments. For example, the present invention may be implemented on a conventional IBM PC or equivalent, multi-nodal system (e.g. LAN) or networking system (e.g. Internet, WWW, wireless web). All programming, GUIs, display panels and dialog box templates, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of communications, database or object-oriented programming.

Conclusion

A system and method has been shown in the above embodiments for the effective implementation of designating and tracking valuables in a opportunistic fashion. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware. In addition, the specific chosen tags (RF ID tags, a bar code tag) are representative of the preferred embodiment and should not be used to limit the scope of the invention.

What is claimed is:

1. A system for unscheduled tracking of valuables, wherein one or more objects designated as valuable receive a tag thereon, said system comprising:
   one or more mobile wireless scanning devices, each of said mobile wireless scanning devices having a unique identifier, said wireless scanning devices associated with one or more clients;
   a tracking server, said tracking server capable of transferring information to and from said one or more mobile wireless scanning devices;
   said mobile wireless scanning devices constantly scanning an area to opportunistically detect said valuable objects in an unscheduled manner, and in the instance said valuable objects are detected, said mobile wireless devices transferring information, regarding the detected valuable object, including information about location and said unique identifiers, to and from said tracking server, whereby said objects of value are tracked in an unscheduled way by accessing said tracking server.

2. A system for unscheduled tracking of valuables, wherein one or more objects designated as valuable receive a tag thereon, as per claim 1, wherein said tag comprises any of the following: RF ID tag, barcode tag, or a tag capable of capturing an image.

3. A system for unscheduled tracking of valuables, wherein one or more objects designated as valuable receive a tag thereon, as per claim 1, wherein said information about location is obtained using at least a GPS system.

4. A system for unscheduled tracking of valuables, wherein one or more objects designated as valuable receive a tag thereon, as per claim 1, wherein said mobile wireless scanning devices is implemented in any of the following devices: laptop computer, mobile computer, wireless telephone, personal digital assistant, or a car system having wireless wide area network (WAN) connectivity.

5. A system for unscheduled tracking of valuables, wherein one or more objects designated as valuable receive a tag thereon, as per claim 1, wherein said information regarding tagged valuables, including information about location and said unique identifiers, is transmitted onto said tracking server over any of the following networks: Internet, wide area network (WAN), local area network (LAN), or a wireless network.

6. A system for unscheduled tracking of valuables, wherein one or more objects designated as valuable receive a tag thereon, as per claim 1, wherein said mobile wireless scanning device further comprises:

a sensor interface, said sensor interface detecting said valuable objects;

a positioning interface, said positioning interface identifying said location of said mobile wireless scanning devices;

a wireless interface, said wireless interface transferring information regarding said detected valuable objects, including information about said location and said unique identifiers, to and from said tracking server;

a graphical user interface (GUI) output interface, said GUI output interface displaying said information regarding valuable objects, including information about said location and said unique identifiers, and a session manager, said session manager managing interaction between each of said interfaces.

7. A system for unscheduled tracking of valuables, wherein one or more objects designated as valuable receive a tag thereon, as per claim 1, wherein said tracking server further comprises:

a wireless interface, said wireless interface receiving said information regarding valuable objects, including information about location and said unique identifiers, from said one or more mobile wireless scanning devices;

a session manager, said session manager periodically calculating the position of said mobile wireless scanning devices relative to pre-defined locations based on said information received by said wireless interface, and one or more interfaces, said one or more interfaces linking said session manager to one or more databases storing information about said valuable objects and said clients.

8. A system for unscheduled tracking of valuables, wherein one or more objects designated as valuable receive a tag thereon, as per claim 7, wherein said client information is stored in a client database, which is accessed by said session manager via a client interface.

9. A system for unscheduled tacking of valuables, wherein one or more objects designated as valuable receive a tag thereon, as per claim 7, wherein said information regarding said valuable object is stored in a valuables database, which is accessed by said session manager via a valuables database interface.

10. A system for unscheduled tracking of valuables, wherein one or more objects designated as valuable receive a tag thereon, as per claim 7, wherein said information regarding said location of said valuable object is stored in a locations database, which is accessed by said session manager via a locations interface.

11. A system for unscheduled tracking of valuables, wherein one or more objects designated as valuable receive a tag thereon, as per claim 7, wherein information regarding status of said valuable object is stored in a status database, which is accessed by said session manager via a status interface.

12. A method for unscheduled tracking of valuables, wherein one or more objects designated as valuable receive a tag thereon, said method comprising:

continuously scanning an area for valuable objects via a mobile wireless scanning device, each of said mobile wireless scanning devices having a unique identifier;

said mobile wireless scanning device opportunistically detecting a valuable object in said scanned area, said scanning performed in an unscheduled manner;

said mobile wireless scanning device determining location of said detected valuable object;

updating information regarding said detected valuable object, including information about location and said unique identifiers, in a tracking server;

said mobile wireless scanning device receiving updated information regarding said detected valuable object from said tracking server, and outputting graphically said received updated information regarding said detected valuable object.

13. A method for unscheduled tracking of valuables, wherein one or more objects designated as valuable receive a tag thereon, as per claim 12, wherein said tag comprises any of the following: RFID tag, barcode tag, or a tag capable of capturing an image.

14. A method for unscheduled tracking of valuables, wherein one or more objects designated as valuable receive a tag thereon, as per claim 12, wherein said location of said detected object is obtained using at least a GPS system.

15. A method for unscheduled tracking of valuables, wherein one or more objects designated as valuable receive a tag thereon, as per claim 12, wherein said mobile wireless scanning devices is implemented in any of the following devices: laptop computer, mobile computer, wireless telephone, personal digital assistant, or a car system having wireless wide area network (WAN) connectivity.

16. A method for unscheduled tracking of valuables, wherein one or more objects designated as valuable receive a tag thereon, as per claim 12, wherein said information regarding tagged valuable objects, including information about location and said unique identifiers, is transmitted onto said tracking server over any of the following networks: Internet, wide area network (WAN), local area network (LAN), or a wireless network.

17. A method for finding a lost valuable by utilizing information stored in a database regarding previously tracked instances of all tagged objects of value, said tagged valuables opportunistically tracked in an unscheduled manner using one or more mobile wireless scanning devices, each having an unique identification, said method comprising:

identifying said lost valuable to be found;

querying said database for a history of said previously tracked instances regarding said identified lost valuable;

receiving said queried history regarding said identified lost valuable from said database;

identifying from said received history a location where said identified lost valuable was last recorded, which of said one or more mobile wireless scanning devices last detected said identified lost valuable, and wherein said identified last recorded location and said last mobile wireless scanning device that detected said identified lost valuable are used to locate said identified lost valuable.

18. A method for finding a lost valuable by utilizing information stored in a database regarding previously tracked instances of all tagged objects of value, said tagged valuables tracked using one or more mobile wireless scanning devices, each having an unique identification, as per claim 17, wherein said identified lost valuable to be found is extracted from a graphical user interface (GUI) input.

19. A method for finding a lost valuable by utilizing information stored in a database regarding previously tracked instances of all tagged objects of value, said tagged valuables tracked using one or more mobile wireless scanning devices, each having an unique identification, as per claim 17, wherein tags on said tagged objects comprises any of the following: RFID tag, barcode tag, or a tag capable of capturing an image.

20. A method for finding a lost valuable by utilizing information stored in a database regarding previously tracked instances of all tagged objects of value, said tagged valuables tracked using one or more mobile wireless scanning devices, each having an unique identification, as per claim 17, wherein said database is accessed over a network.

21. A method for finding a lost valuable by utilizing information stored in a database regarding previously tracked instances of all tagged objects of value, said tagged valuables tracked using one or more mobile wireless scanning devices, each having an unique identification, as per claim 20, wherein said network comprises any of the following: local area network (LAN), wide area network (WAN), wireless network, HTTP protocol-based networks, or Internet.

22. A method for identifying objects of value from a set of one or more objects and logging information regarding said objects of value in a database, said method comprising:
   opportunistically identifying an object of value from said set of one or more objects of value in an unscheduled manner, said objects of value associated with one or more clients each having a unique identification;
   recording a time of detection associated with a time when said object of value is identified;
   tagging said identified object of value;
   assigning a unique tag identification to said tagged object of value;
   detecting a location associated wit said tagged object of value, and
   creating a entry in said database with information about said identified object of value, including said unique tag identification, said detected location, said time of detection, and said unique client identification associated with one or with more clients to whom said identified object is of value.

23. A method for identifying objects of value from a set of one or more objects and logging information regarding said objects of value in a database, as per claim 22, wherein tags in said tagged objects comprises any of the following: RFID tag, barcode tag, or a tag capable of capturing an image.

24. A method for identifying objects of value from a set of one or more objects and logging information regarding said objects of value in a database, as per claim 22, wherein said step of detecting a location is accomplished using at least a global positioning system (GPS).

25. A method for identifying objects of value from a set of one or more objects and logging information regarding said objects of value in a database, as per claim 22, wherein said database is accessed over a network.

26. A method for identifying objects of value from a set of one or more objects and logging information regarding said objects of value in a database, as per claim 24, wherein said network comprises any of the following: local area network (LAN), wide area network (WAN), wireless network, HTTP protocol-based networks, or Internet.

* * * * *